Oct. 5, 1937.   V. P. MAHONEY ET AL   2,095,143
AUTOMOBILE JACK
Filed April 27, 1937   3 Sheets-Sheet 1
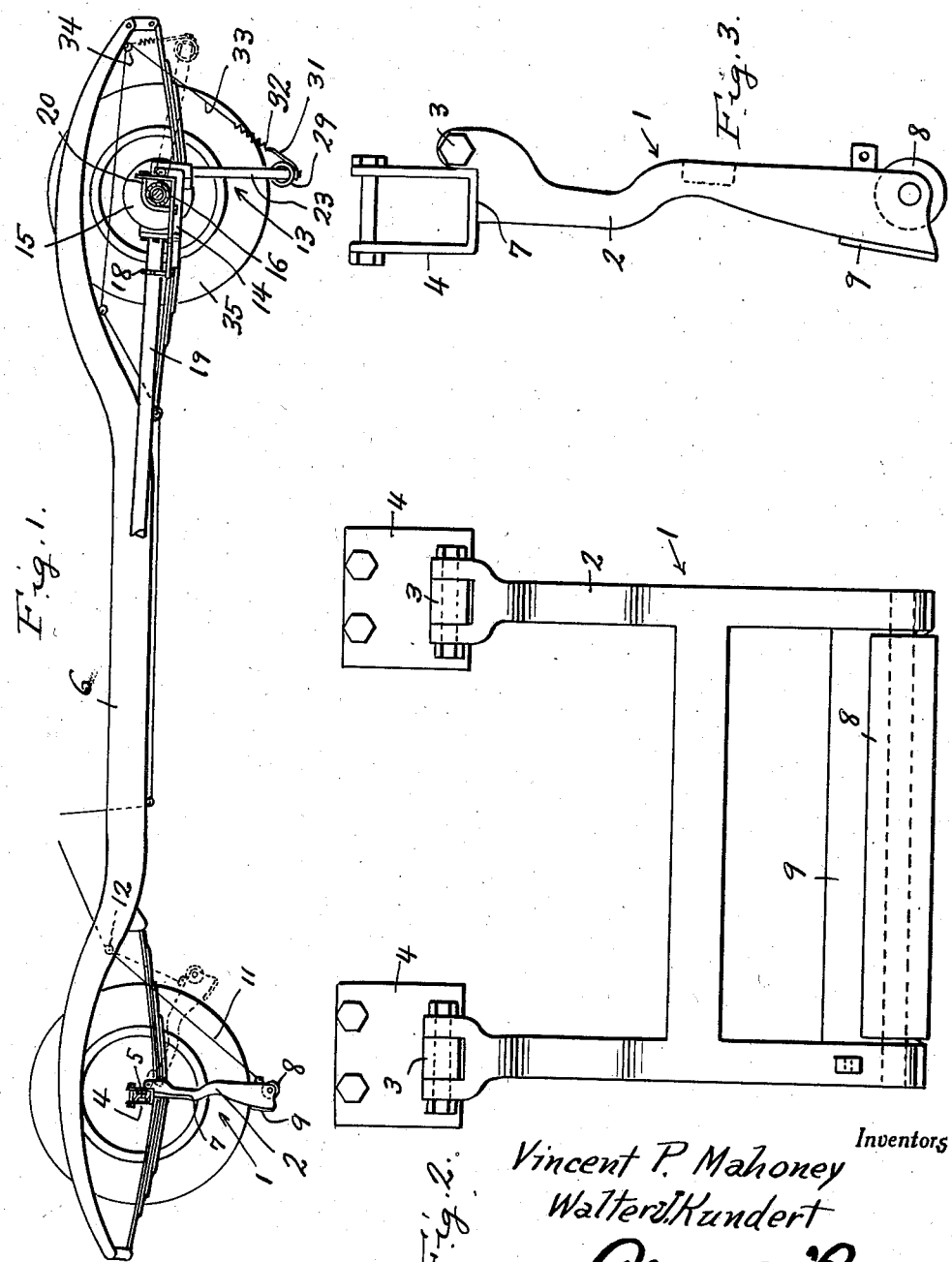
Inventors
Vincent P. Mahoney
Walter J. Kundert
By Clarence A. O'Brien
Hyman Berman
Attorneys

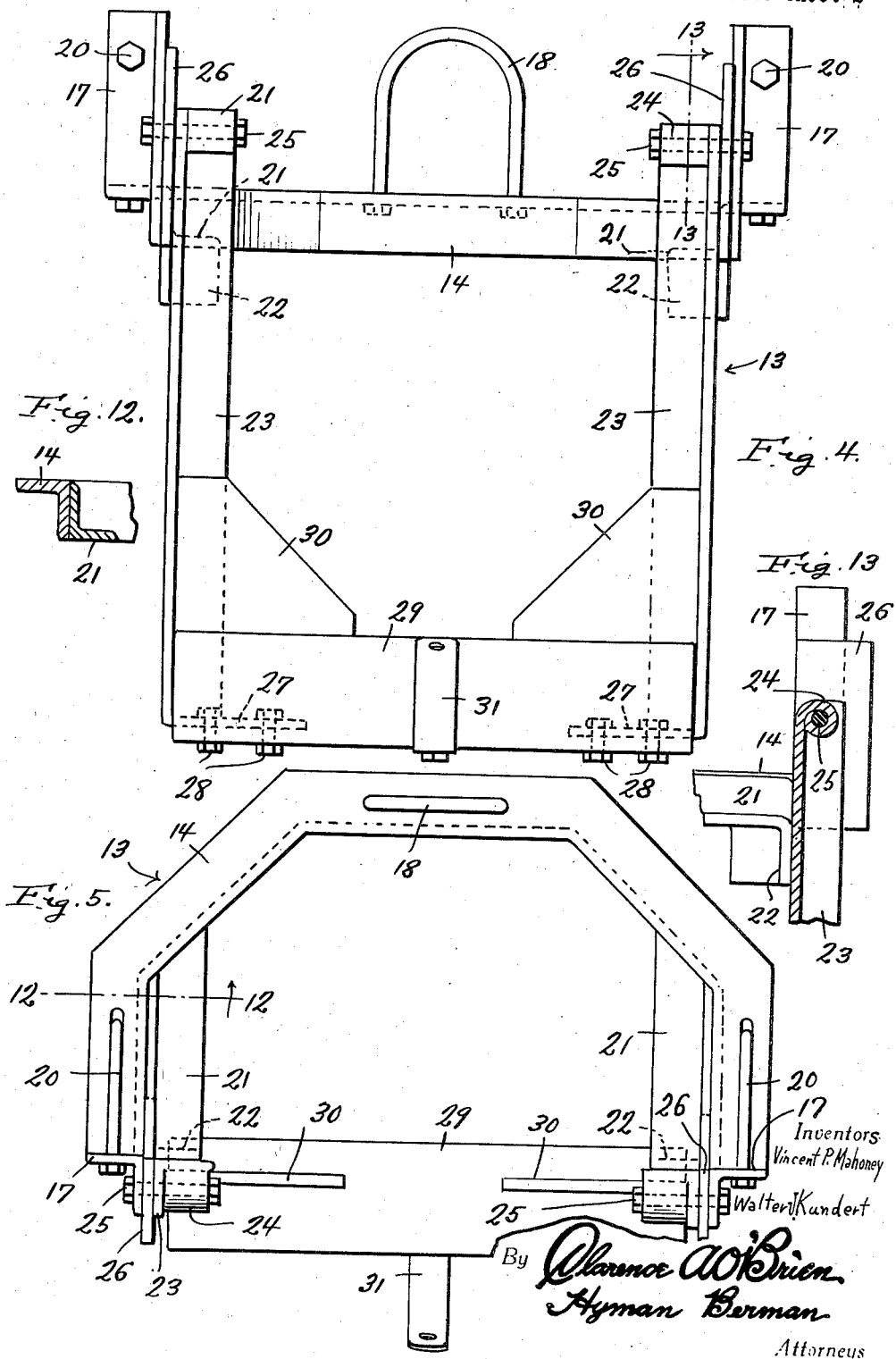

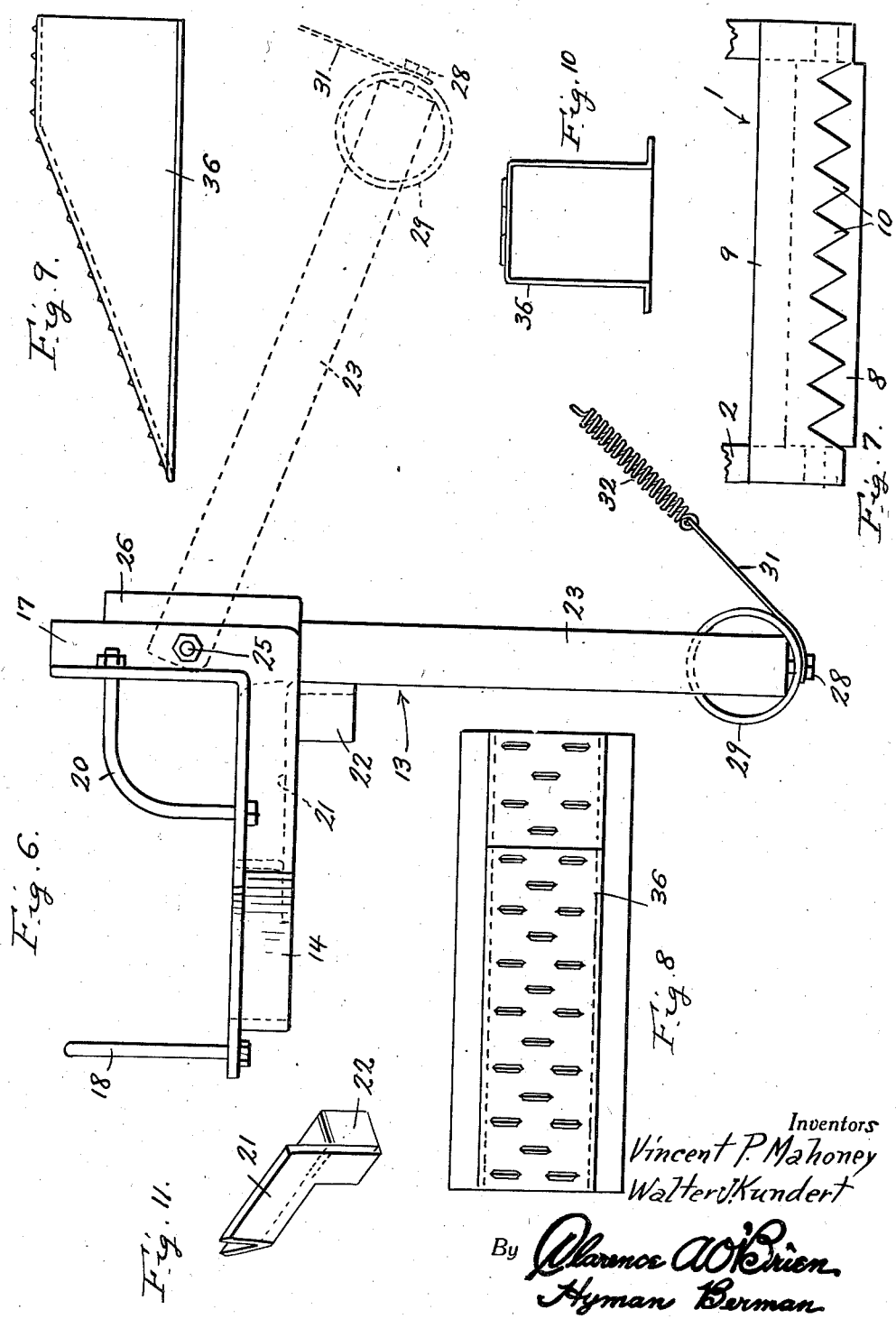

Patented Oct. 5, 1937

2,095,143

UNITED STATES PATENT OFFICE 2,095,143

AUTOMOBILE JACK

Vincent P. Mahoney and Walter J. Kundert, Madison, S. Dak.

Application April 27, 1937, Serial No. 139,272

3 Claims. (Cl. 254—86)

The present invention relates to new and useful improvements in automobile jacks and has for one of its important objects to provide, in a manner as hereinafter set forth, an apparatus embodying a novel construction and arrangement whereby the motion or momentum of the vehicle may be utilized to lift the front or rear end thereof.

Another very important object of the invention is to provide an apparatus of the aforementioned character which is permanently installed on the automobile and ready for operation at all times and which may be conveniently controlled from the operator's seat of the vehicle.

Other objects of the invention are to provide an automobile jack or lifting apparatus of the character described which will be comparatively simple in construction, strong, durable, highly efficient and reliable in use, compact, light in weight and which may be manufactured and installed at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a side elevational view of the invention, showing same installed and in operative position beneath the chassis of an automobile.

Figure 2 is a view in rear elevation of the front jack.

Figure 3 is a view in side elevation of the front jack.

Figure 4 is a view in rear elevation of the rear jack.

Figure 5 is a top plan view of the rear jack.

Figure 6 is a view in side elevation of the rear jack.

Figure 7 is a detail view in front elevation of the lower portion of the front jack.

Figure 8 is a detail view in top plan of the rear wheel block.

Figure 9 is a detail view in side elevation of the rear wheel block.

Figure 10 is a view in rear elevation of the rear wheel block.

Figure 11 is a detail view in perspective of one of the stops constituting a part of the rear end jack.

Figure 12 is a detail view in cross section, taken substantially on the line 12—12 of Fig. 5.

Figure 13 is a vertical sectional view, taken substantially on the line 13—13 of Fig. 4.

Referring now to the drawings in detail, it will be seen that the embodiment of the apparatus which has been illustrated comprises a front jack which is designated generally by the reference numeral 1. As illustrated to advantage in Figs. 1 to 3, inclusive, of the drawings, the jack 1 includes a substantially H shaped metallic member 2 which is pivotally connected, as at 3, to the lower rear portions of a pair of substantially U-shaped metallic clamps 4 which are secured on the front axle 5 of the automobile 6. Adjacent the pivots 3 the member 2 is formed to provide shoulders 7 which are engageable beneath the clamps 4 in a manner to limit the downward and forward swinging movement of said member 2 and to support the front end of the vehicle in raised or elevated position.

Journaled in the lower portion of the member 2 is a ground engaging roller 8. Also mounted transversely on the lower portion of the member 2, forwardly of the roller 8, is a metallic plate 9 having a toothed lower edge 10 (see Fig. 7). A flexible cable or the like 11 is connected to the lower portion of the member 2 for operation from the driver's seat of the vehicle, said cable being trained over suitable pulleys 12.

The reference numeral 13 designates generally the rear jack of the apparatus. The rear jack 13 comprises a substantially U-shaped horizontal frame 14 of angle iron which straddles the lower portion of the differential housing 15 of the vehicle beneath the rear axle housings 16 thereof and which terminates in upturned end portions 17. A U bolt 18 secures the forward portion of the frame 14 beneath the drive shaft housing 19 of the automobile. Angle members 20 extend between the side portions of the frame 14 and the upturned end portions 17 thereof for securing said frame beneath the axle housings 16.

Mounted longitudinally in the frame 14 on the inner sides of the side portions thereof are bars 21 of angle iron which terminate in downturned rear end portions constituting stops 22. Pivotally mounted for swinging movement in a vertical plane on the inner sides of the upturned end portions 17 of the frame 14 is a pair of legs 23 of angle iron. One of the flanges of each of the angle iron legs 23 terminates, at its upper end, in an eye 24 (see Figs. 4 and 5) through which a pivot bolt 25 passes. Plates 26 are interposed between the pivoted end portions of the legs 23 and the upturned end portions 17 of the frame 14, said plates being fixed to the latter.

The legs 23 terminate in inturned lower end portions 27 which are secured, as at 28, in the end portions of a transversely extending tubular member 29. It will be observed that the end portions 21 are secured to the lower portion of the tubular member 29. Braces 30 are provided on the legs 23 for the member 29. Secured to the tube 29 and extending rearwardly and upwardly therefrom is a metallic strap 31 to which a coil spring 32 is connected. A cable or the like 33 is connected to the spring 32, said cable being trained over suitable pulleys 34 for actuation from the operator's seat of the vehicle.

It is thought that the operation of the invention will be readily apparent from a consideration of the foregoing. The front and rear jacks 1 and 13, respectively, when not in use, are supported in raised position beneath the automobile by the cables 11 and 33, respectively. Any suitable means may be provided in the vehicle for securing the cables 11 and 33 for holding the jacks in raised position. Now, should it be desired to raise the front end of the automobile, said automobile is driven in reverse and the cable 11 is fed out to lower the jack 1. As the jack 1 is thus lowered the teeth 10 on the plate 9 engage the ground first and bite thereinto for lifting the front end of the vehicle in a manner which is thought to be well understood. When the front end of the vehicle is in raised position the roller 8 is engaged with the ground and the shoulders 7 are engaged beneath the clamps 4. From the foregoing it will be seen that both front wheels of the automobile will be raised simultaneously and uniformly. The shoulders 7 engage beneath the clamps 4 for preventing the jack 1 from swinging downwardly and forwardly beyond a substantially vertical position.

To raise the rear end of the vehicle said vehicle is driven in reverse and the jack 13 is lowered into engagement with the ground and said vehicle rides upwardly thereon by momentum in a manner to lift the rear wheels 35. When this operation is performed the legs 23 of the jack 13 are arrested by the stops 22. To lower the rear end of the automobile, blocks 36 (see Figs. 8, 9 and 10), are inserted beneath the rear wheels 35 in order that traction may be had for driving the vehicle forward and down off the jack 13, thus permitting said jack to be raised to inoperative position through the medium of the cable 33. It will thus be seen that an apparatus, operable from the driver's seat of the vehicle, has been provided through the medium of which either end of said vehicle may be conveniently raised at any time.

It is believed that the many advantages of an automobile jack constructed in accordance with the present invention will be readily understood and although a preferred embodiment of the apparatus is as illustrated and described, it is to be understood that changes in the details of construction and in the combination and arrangement of parts may be resorted to which will fall within the scope of the invention as claimed.

What is claimed is:

1. An automobile jack comprising a substantially U-shaped frame, said frame including upturned end portions, means for securing said frame substantially horizontally beneath the rear end portion of an automobile, a pair of legs pivotally mounted on the upturned end portions of the frame for swinging movement in a vertical plane, a member extending between the free end portions of said legs and engageable with the ground, means for securing said legs and member in inoperative position, and stops on the frame for limiting the swinging movement of the legs toward operative position.

2. An automobile jack including a substantially U-shaped frame comprising upturned end portions, means for securing said frame at an intermediate point beneath the drive shaft housing of an automobile, means extending between the side portions of the frame and the upturned end portions thereof for securing said frame beneath the axle housings of the automobile on opposite sides of the differential housing of said automobile, a pair of spaced, parallel legs pivotally connected, at one end, to the upturned end portions of the frame for swinging movement in a vertical plane, a ground engaging member extending between the free end portions of the legs, means on the frame engageable with the legs for limiting the swinging movement of said legs toward operative position, and flexible means operable from the driver's seat of the automobile for supporting the legs and member in inoperative position.

3. An automobile jack comprising a substantially U-shaped frame of angle iron including upturned end portions, means for securing said frame in a substantially horizontal position beneath the rear end portion of an automobile, legs of angle iron pivotally connected, at one end, to the upturned end portions of the frame for swinging movement in a vertical plane, a tubular ground engaging member extending between the free end portions of the legs, said legs terminating in inturned free end portions secured in said tubular member, and bars mounted in the frame and terminating in downturned end portions constituting stops engageable with the legs for limiting the swinging movement of said legs toward operative position.

VINCENT P. MAHONEY.
WALTER J. KUNDERT.